United States Patent
Kalos et al.

(10) Patent No.: US 7,257,663 B2
(45) Date of Patent: Aug. 14, 2007

(54) INITIATING AND USING INFORMATION USED FOR A HOST, CONTROL UNIT, AND LOGICAL DEVICE CONNECTIONS

(75) Inventors: Matthew Joseph Kalos, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 10/991,770

(22) Filed: Nov. 17, 2004

(65) Prior Publication Data

US 2006/0123157 A1    Jun. 8, 2006

(51) Int. Cl.
G06F 13/00    (2006.01)
(52) U.S. Cl. ...................... 710/316; 711/111
(58) Field of Classification Search ............... 710/316; 711/111–114, 154
See application file for complete search history.

(56) References Cited

U.S. PATENT DOCUMENTS

| | | | |
|---|---|---|---|
| 6,115,772 A | | 9/2000 | Crater |
| 7,047,390 B2* | | 5/2006 | Factor et al. ............... 711/202 |
| 2004/0064461 A1 | | 4/2004 | Pooni et al. |
| 2004/0064594 A1 | | 4/2004 | Pooni et al. |
| 2006/0184731 A1* | | 8/2006 | Corbett et al. ............... 711/114 |

OTHER PUBLICATIONS

U.S. Patent Application entitled "Maintaining and Using Nexus Information on a Host, Port and Device Connection", Serial No. not yet assigned, filing date Nov. 17, 2004, by inventors M.J. Kalos, and R.A. Ripberger.

* cited by examiner

*Primary Examiner*—Mark H. Rinehart
*Assistant Examiner*—Clifford Knoll
(74) *Attorney, Agent, or Firm*—David W. Victor; Konrad Raynes & Victor LLP

(57) ABSTRACT

Provided are a method, system, and program for initiating and using information used for a host, control unit, and logical device connections receiving a request to create a host port to control unit port connection. In a volume group data structure, a volume group entry is defined having a plurality of pointers for the host port and control unit port pair. At least one device address is added to the volume group that is accessible to the host port and control unit port connection by initializing at least one pointer in the volume group entry to address at least one device data structure. For each of the at least one device addresses, indication is made in the at least one device data structure addressed by the at least one pointer in the volume group entry that the device address is accessible to the host port and control unit port connection.

29 Claims, 8 Drawing Sheets

INITIATING AND USING INFORMATION USED FOR A HOST, CONTROL UNIT, AND LOGICAL DEVICE CONNECTIONS

BACKGROUND OF THE INVENTION

1. Field of the Invention

The present invention relates to a method, system, and program for initiating and using information used for host, control unit, and logical device connections.

2. Description of the Related Art

In certain computing environments, multiple host systems may communicate with one or more control units, such as an IBM Enterprise Storage Server (ESS)®, for data in a storage device managed by the ESS receiving the request. The control unit manages access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit may configure logical volumes that define regions of storage space in the storage devices the control unit manages.

The control unit or an adaptor in the control unit may maintain volume group information, where each volume group associates one or more logical volumes with either one or more hosts, or one or more host ports. The volume group information may comprise a bitmap, where there is a bitmap value for each logical volume available through the control unit indicating whether the logical volume is available for a particular host and port connection. In current systems, the control unit may initialize bitmaps for every possible host and port connection to indicate the accessibility of all logical volumes to that host and port connection. The number of bitmaps that may be allocated comprises the number of host ports times the number of control unit ports through which the hosts connect times the number of bits needed to represent all logical volumes, e.g., LUNs, available through the control unit. As the number of logical volumes, ports, and supported host connections on a control unit increases, the amount of memory needed to be allocated for the volume group information increases substantially.

Further, the control unit or adaptor may maintain for each logical volume, e.g., Logical Unit Number (LUN), persistent reservation information. The persistent reservation information is information for a host port, control unit port, and logical volume that is used to manage which hosts are allowed to join or modify the reservation. On a control unit that supports a large number of logical volumes that are accessible through Input/Output (I/O) ports on the control unit, the potential number of relationships requiring persistent reservation information is the number of ports times the number of logical volumes times the number of host ports. Each persistent reservation data entry may require from 20 to 256 bytes. In current systems, the control unit reserves space for each possible entry of persistent reservation information. The control unit may also reserve space in memory. As the number of supported logical volumes, host ports, an control unit ports increases, the amount of memory required to be reserved for persistent reservation information increases substantially.

SUMMARY

Provided are a method, system, and program for initiating and using information used for a host, control unit, and logical device connections receiving a request to create a host port to control unit port connection. In a volume group data structure, a volume group entry is defined having a plurality of pointers for the host port and control unit port pair. At least one device address is added to the volume group that is accessible to the host port and control unit port connection by initializing at least one pointer in the volume group entry to address at least one device data structure. For each of the at least one device addresses, indication is made in the at least one device data structure addressed by the at least one pointer in the volume group entry that the device address is accessible to the host port and control unit port connection.

Further provided are a method, system, and program for associating a device with a plurality of pointers. One pointer is initialized to point to a page having a plurality of entries, wherein each entry maintains persistent reserve information for the device.

DETAILED DESCRIPTION

Figure 1:
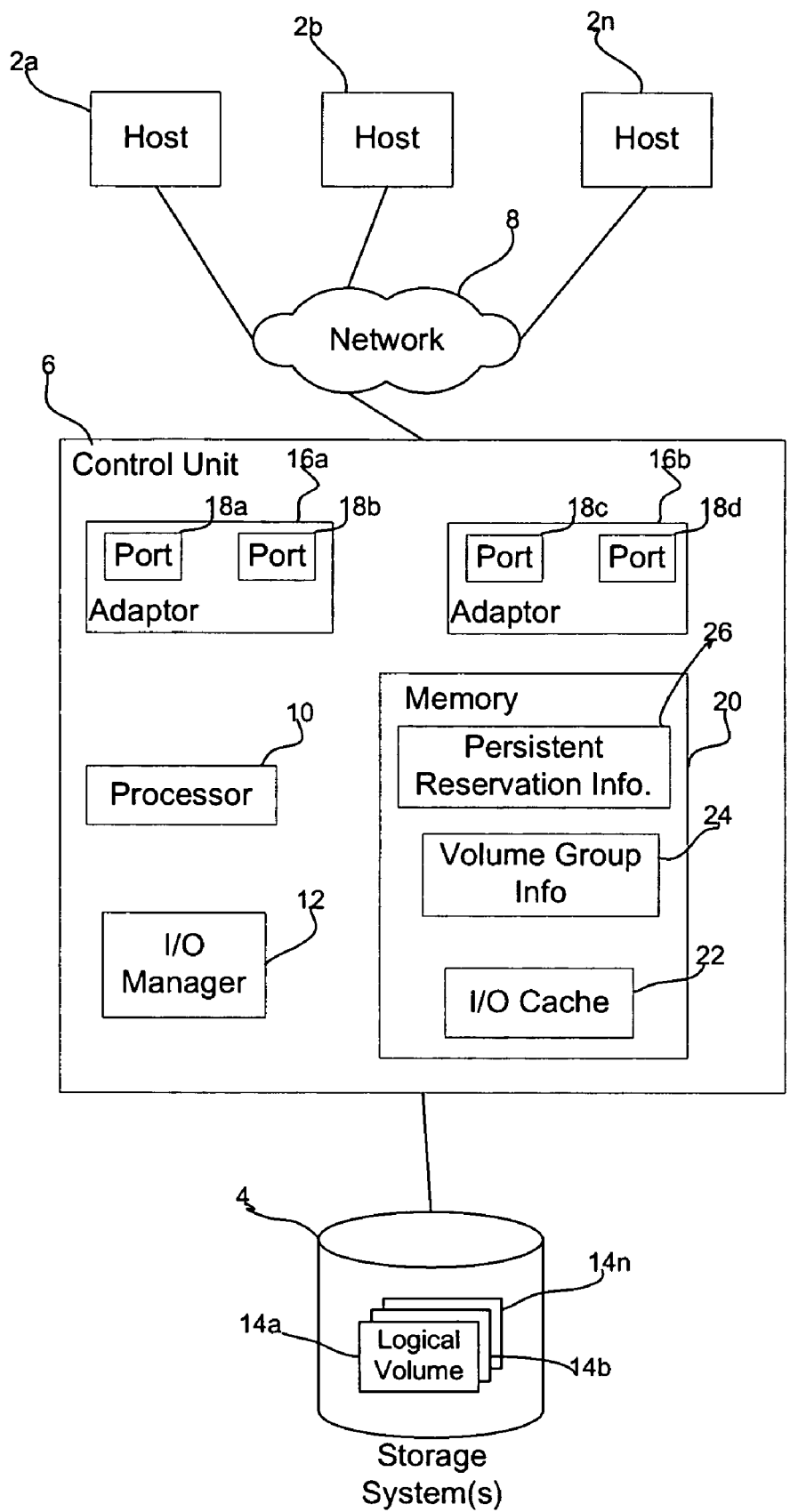
FIG. 1 illustrates an embodiment of a computing environment.

FIG. 1 illustrates an embodiment of a computing environment. Multiple hosts 2a, 2b . . . 2n communicate Input/Output (I/O) requests directed to one or more storage systems 4 (only one is shown) to a control unit 6 over a network 8, where the control unit 6 manages access to the storage system(s) 4. The control unit 6 includes a processor 10 that executes I/O manager code 12 to configure and manage logical volumes 14a, 14b . . . 14n in the storage system(s) 4. A volume comprises a logical representation of a section of the storage space in the storage systems 4 that may be referenced by the hosts 2a, 2b . . . 2n, such as a logical device or logical unit number (LUN). Each host 2a, 2b . . . 2n may include one or more host ports on host adaptor cards. The control unit 6 includes a plurality of adaptors 16a, 16b, including ports 18a, 18b, 18c, and 18d. There may be more or fewer adaptors and ports and more or fewer ports per adaptor than shown in FIG. 1. Each host 2a, 2b . . . 2n port may connect to each of the ports 18a, 18b . . . 18n to connect to the logical volumes 14a, 14b . . . 14n.

The control unit 6 includes a memory 20, such as a non-volatile memory including an I/O cache 22, volume group information 24, and persistent reservation information 26. The volume group information 24 includes information on volume groups, where each volume group identifies one or more logical volumes 14a, 14b . . . 14n, e.g., Logical Unit Numbers (LUNs) a host 2a, 2b . . . 2n may access through the control unit 6. The persistent reservation information 26 includes persistent reservation information for different logical volumes 14a, 14b . . . 14n. Although it is possible that any host 2a, 2b . . . 2n port may connect through any control unit port 18a, 18b, 18c, 18d to connect to any logical volume 14a, 14b . . . 14n, in many implementations a host port may connect to fewer than all possible control unit ports and fewer than all possible logical volumes through the ports. Further, persistent reservation information could be requested by all hosts connecting through all ports to all devices. However, in many implementations, a limited number of hosts 2a, 2b . . . 2n would access a logical volume 14a, 14b . . . 14n and provide reservation information for the logical volume. The I/O manager code 12 is capable of using the persistent reservation information 26 and volume group information 24 when processing requests to logical volumes 14a, 14b . . . 14n from different host and port connections.

The hosts 2a, 2b . . . 2n may comprise computing systems capable of communicating I/O requests over a network, such as a server, workstation, desktop, mainframe, laptop, hand held computing device, telephony device, etc. The control unit 6 may comprise a storage server, enterprise storage server, storage controller or other device used to manage I/O requests directed to storage systems 4 managed by the control unit. In one embodiment, the described operations to manage volume groups and persistent reservations are performed relative to a zSeries® server host interconnections implemented in a fiber connectivity (FICON) I/O interface. (FICON and zSeries are registered trademarks of International Business Machines (IBM) Corp oration). In another embodiment, the described operations to manage volume groups and persistent reservations are performed relative to a Fibre Channel interface using a Small Computer System Interface (SCSI) upper layer protocol (ULP). The storage system(s) 4 may include one or more storage devices known in the art, such as interconnected hard disk drives (e.g., configured as a DASD, RAID, JBOD, etc.), magnetic tape drive, electronic memory, etc. The network 8 may comprise a local area network (LAN), storage area network (SAN), the Internet, and Intranet, a wireless network, bus interface, serial or parallel connection, etc.

Figure 2:
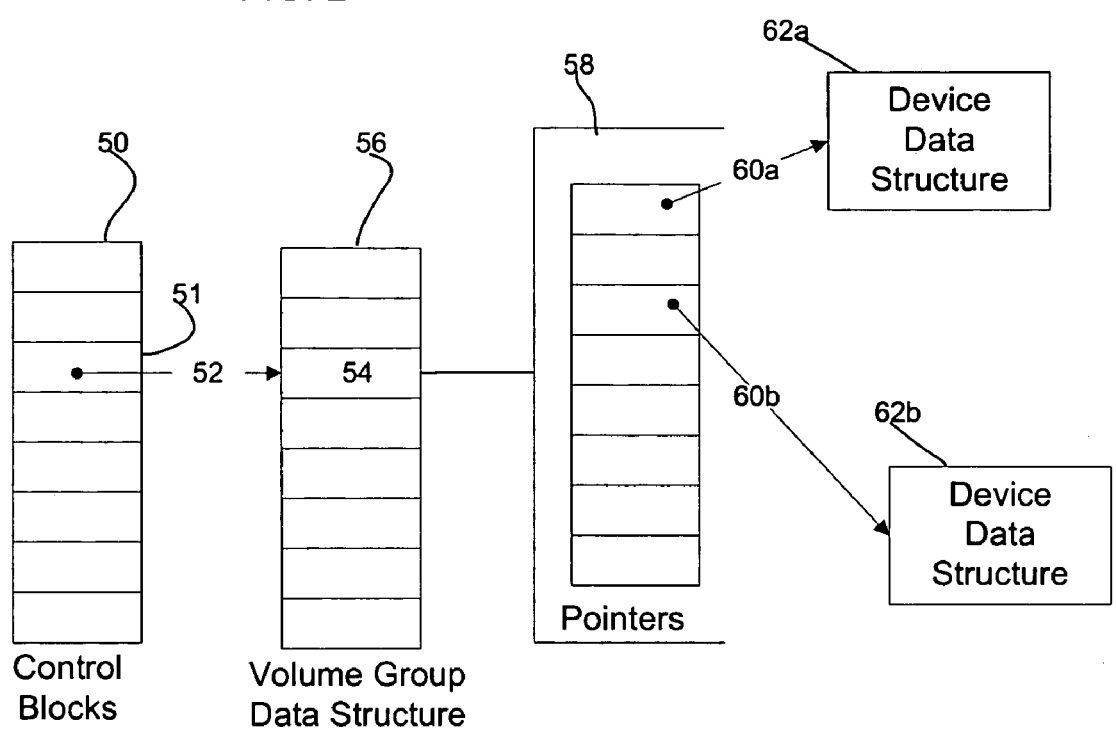
FIG. 2 illustrates an embodiment of data structures used to maintain volume group information.

FIG. 2 illustrates an arrangement of data structures used to maintain the volume group information 24 for different host 2a, 2b . . . 2n and control unit port 18a, 18b, 18c, 18d connections. Host-port control blocks 50 comprise control blocks associated with specific host and port connections. In one embodiment, a host port connection on a FICON interface refers to a set of N-port logins from a set of host channels with the same world wide node name (WWNN). In one embodiment, a host port connection on a FICON interface refers to any N-port login from a host channel to a particular control unit port. In one embodiment, a host port connection on a SCSI interface refers to a N-port login from a host port with a given world wide port name (WWPN). In one embodiment, a host port connection on a SCSI interface refers to any N-port login from a host port to a particular control unit port. Thus, when adding a new connection for a new host-port combination, a control block, e.g., 51, is added. A control block 51 includes a pointer 52 that addresses one volume group 54 of the volume group data structure 56 available for all host-port connections. Each volume group 54, which may comprise a page or other data structure, includes a plurality of pointers 58, where each pointer, e.g., 60a, 60b, addresses a separate device data structure, e.g., 62a, 62b. Each device data structure, e.g., 62a, 62b, has entries, where each entry represents the accessibility of one device to the host-port connection. In one embodiment, the device data structure 62a, 62b may comprise a bitmap, where each bitmap value is associated with a different device (i.e., logical volume 14a, 14b . . . 14n). A bitmap value may be set to "one" to indicate the accessibility of that represented logical volume 14a, 14b . . . 14n to the host-port connection addressing that logical volume 14a, 14b . . . 14n. Alternatively, the device data structure may comprise a list of logical volume 14a, 14b . . . 14n entries, where each entry indicates whether that logical volume 14a, 14b . . . 14n is accessible to the particular host and port connection.

The hosts 2a, 2b . . . 2n may identify a device (logical volume 14a, 14b . . . 14n) by one address that the I/O manager 12 may associate with a device address, where a first portion of the device address indicates one pointer, e.g., 60a, 60b, in the volume group 54 and a second portion of the device address indicates one entry in the device data structure, e.g., 62a, 62b addressed by the pointer indicating whether the specific device (logical volume 14a, 14b . . . 14n) is accessible to the host and port connection. In an alternative embodiment, the device address used to identify the pointer and entry in the device data structure may comprise the device address used by the hosts 2a, 2b . . . 2n to reference the device.

In one embodiment, the device data structure may indicate the accessibility of devices having consecutive device addresses. Further, one volume group for one host and port connection may have at least two pointers that address different device data structures. Further, at least two of the device data structures addressed by the pointers may indicate the availability of devices having discontiguous device addresses. Yet further, at least one device data structure for one host and port connection may indicate that less than all the devices identified in the device data structure are accessible. Still further, two control blocks for different host and port connections may address the same volume group and associated pointers.

Figure 3:
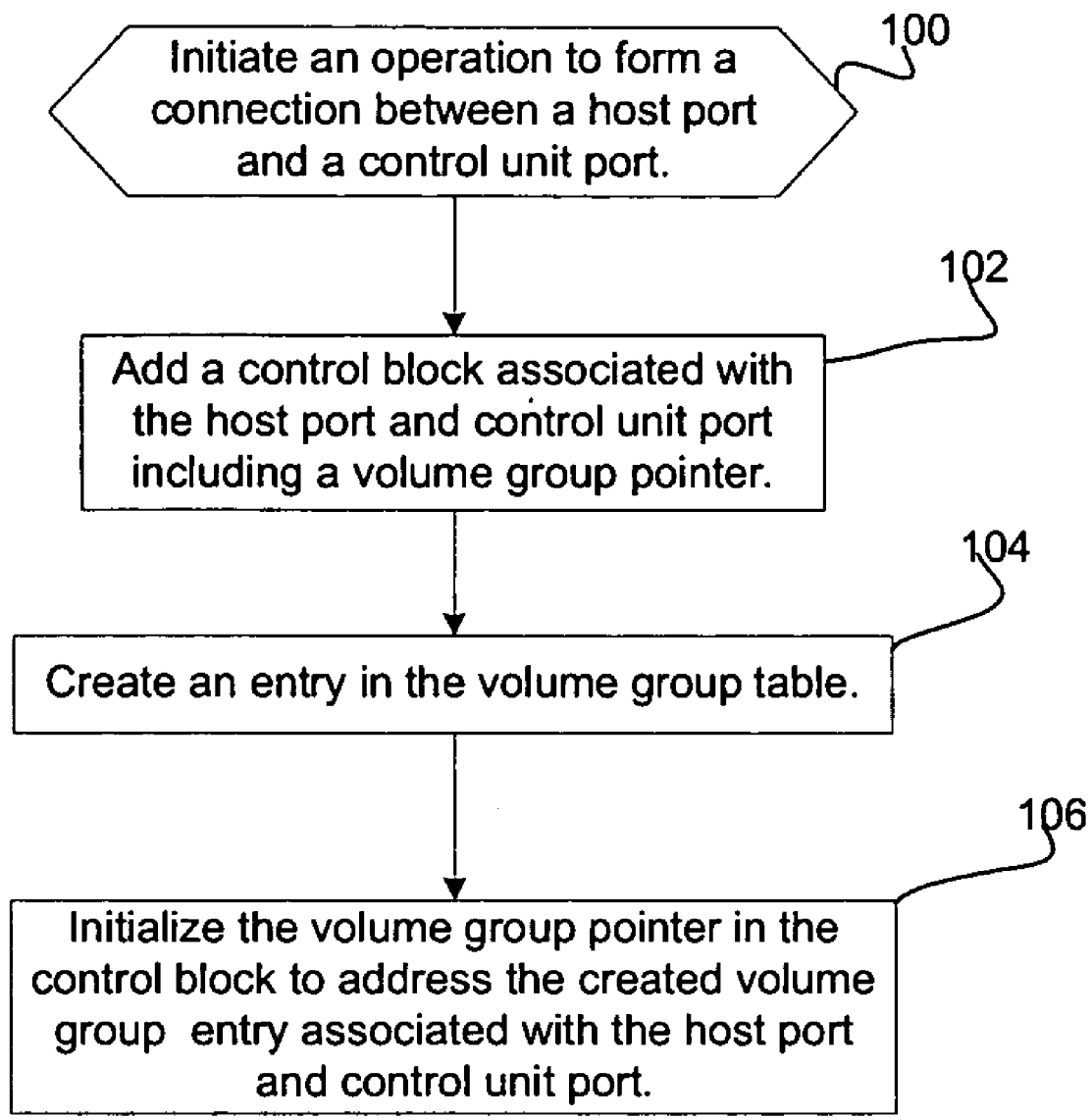
FIGS. 3, 4 and 5 illustrate an embodiment of operations to generate and use the volume group information.

FIG. 3 illustrates operations implemented in the I/O manager 12 initialize the control block entry 51 and volume group entry, e.g., 54, for the host port and control unit port connection. Upon initiating (at block 100) this operation to form a connection between a host port and a control unit port, the I/O manager 12 adds (at block 102) a control block, e.g., 51 (FIG. 2) associated with the host port and control unit port including a volume group pointer 52. An entry, e.g., 54, is created (at block 104) in the volume group data structure 56. The volume group pointer 52 in the control block 51 is initialized (at block 106) to address the created volume group entry 54 associated with the host port and control unit port.

Figure 4:
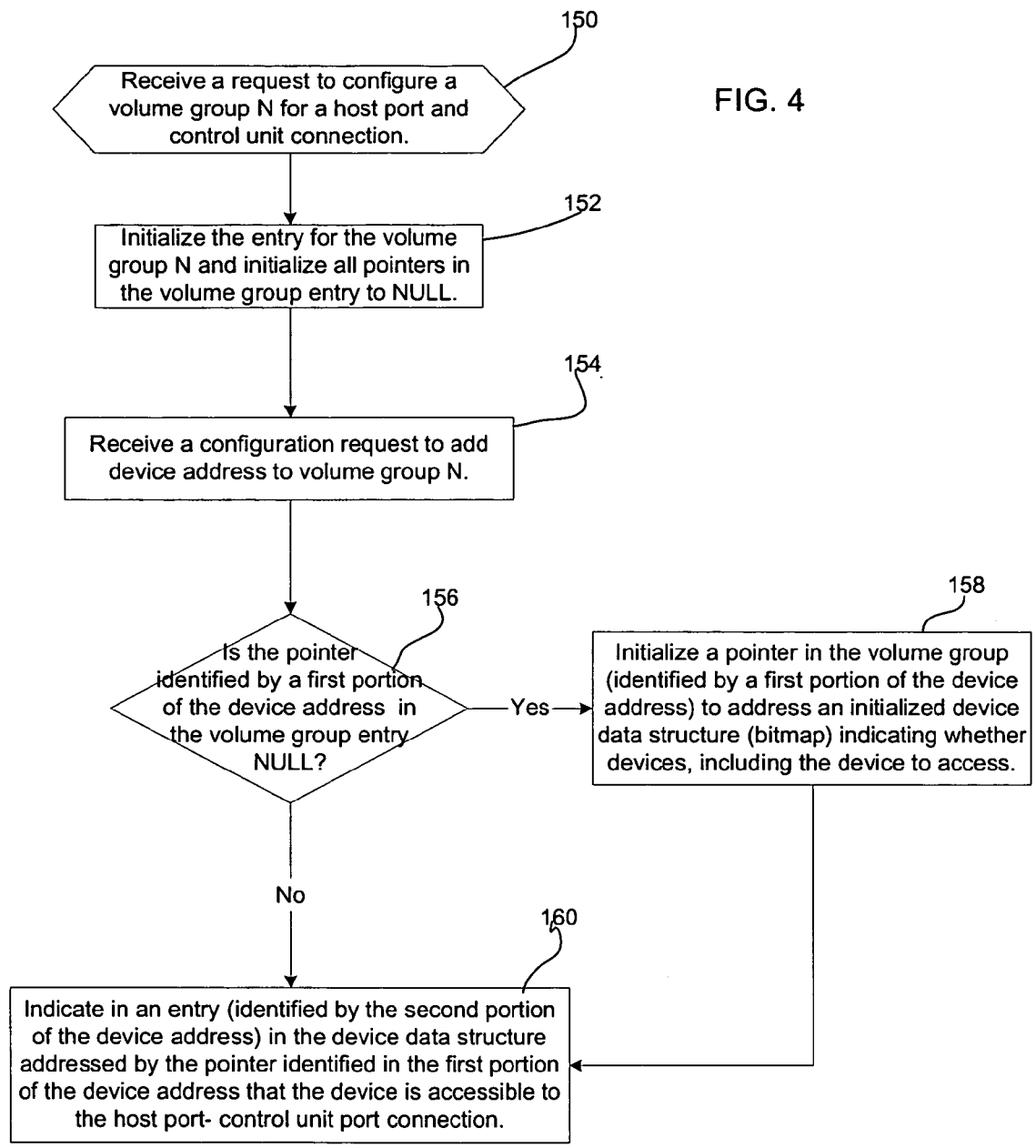

FIG. 4 illustrates an embodiment of operations implemented in the I/O manager 12 to (1) configure a volume group, (2) add a device address to the volume group, and (3) enable a host and port connection to access a volume group as described below. Upon receiving a request (at block 150) to configure a volume group entry N, e.g., 54, for a host port and control unit connection, the I/O manager 12 initializes (at block 152) the entry, e.g., 51, for the volume group N and initializes all pointers, e.g., 60a, 60b, in the volume group entry to NULL. Upon receiving (at block 154) a configuration request to add device address to volume group N, the I/O manager 12 determines (at block 156) whether the pointer identified by the first portion of the device address in the volume group entry, e.g., is NULL. If so, the I/O manager 12 initializes (at block 108) a pointer, e.g., 60a, 60b, (identified by the first portion of the device address) in the volume group, e.g., 54, for the host-port connection, where the initializes pointer addresses an initialized device data structure 62a, 62b. The device data structure may be initialized and allocated at the time when the pointer is initialized, thus provisioning memory on an as needed basis. If (from the no branch of block 110) there is a non-NULL pointer identified by the first portion of the device driver or after (at block 108) such a pointer and corresponding device data structure are initialized, the I/O manager 12 indicates (at block 110) in the entry (identified by the second portion of the device address) in the device data structure (addressed by the pointer identified in the first portion of the device address) that the device is accessible to the host port and control unit port connection.

Figure 5:
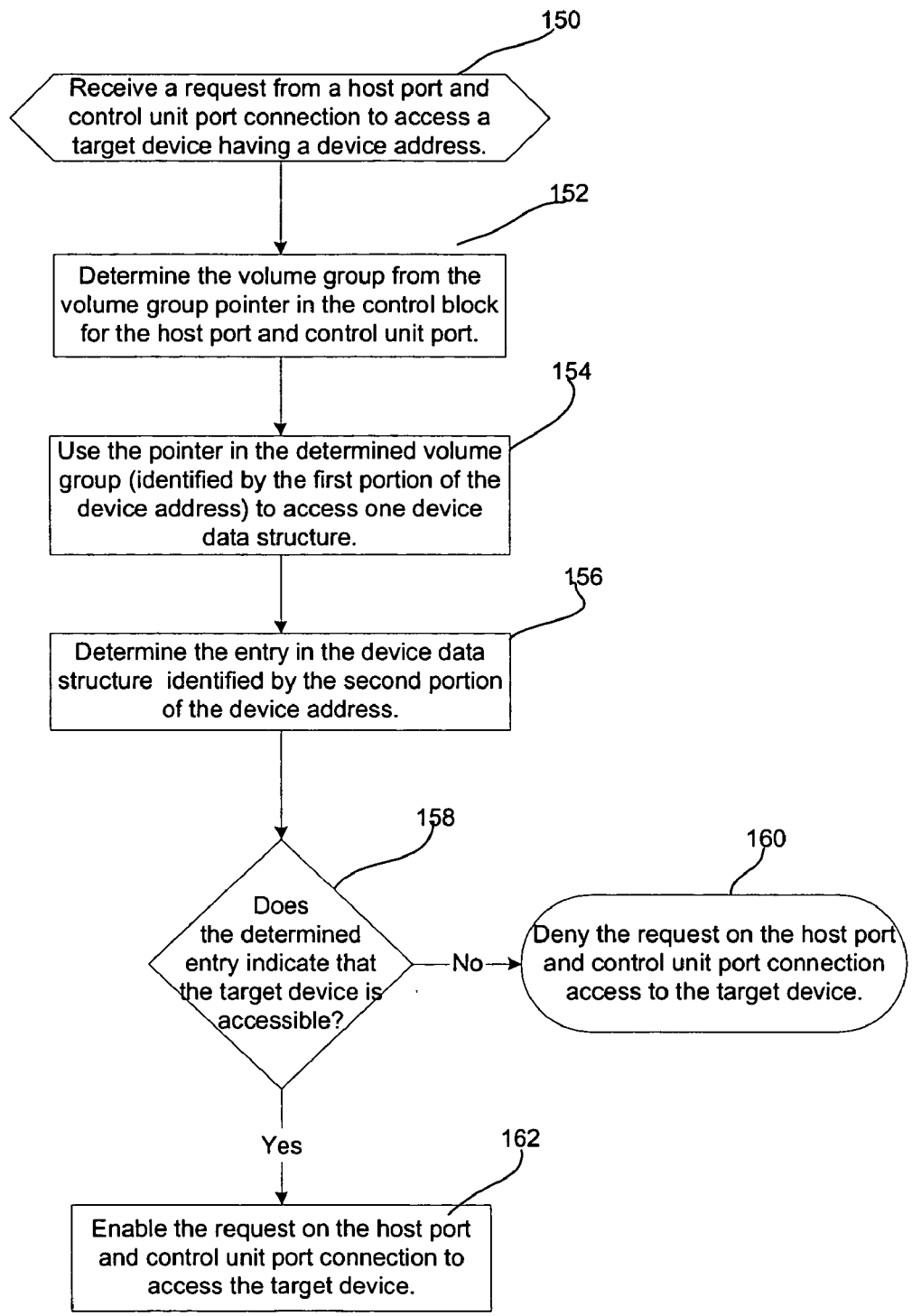

FIG. 5 illustrates operations performed by the I/O manager 12 to determine whether a host 2a, 2b . . . 2n on a control unit port 18a, 18b, 18c, 18d may access a device (logical volume 14a, 14b . . . 14n). Upon receiving (at block 150) a request from a host 2a, 2b . . . 2n port and control unit port 18a, 18b, 18c, 18d connection to access a target device (logical volume 14a, 14b . . . 14n) having a device address, a determination is made (at block 152) of the volume group, e.g., 54 (FIG. 2), from the volume group pointer, e.g., 52, in the control block, e.g., 51, for the host port and control unit port connection. The I/O manager 12 uses (at block 154) the pointer, e.g., 60a, 60b, in the determined volume group identified by the first portion of the device address to access one device data structure, e.g., 62a, 62b. The entry in the device data structure, e.g., 62a, 62b, identified by the second portion of the device address, is determined (at block 156). If (at block 158) the determined entry indicates that the target device is not accessible, then the I/O manager 12 denies (at block 160) the request on the host port and control unit port connection access to the target device (logical volume 14a, 14b . . . 14n). Otherwise, if the device is accessible, then the I/O manager 12 enables the request access to the requested target device.

In further embodiments, if a logical volume is removed from a volume group, e.g., 54, by updating the entry in the device data structure, e.g., 62a, 62b, to indicate that the logical volume 14a, 14b . . . 14n is inaccessible, then that device data structure page is scanned. If all the entries in that scanned device data structure page are indicated as inaccessible, than the pointer 60a, 60b to that device data structure may be nullified and the page implementing the device data structure addressed by that pointer may be released. A null pointer indicates that all devices identified in the device data structure addressed by that pointer are inaccessible to the host and port connection.

For instance, if there are 64K, where K=1024, logical volumes 14a, 14b . . . 14n and each device data structure is 512 bytes and can provide information on 4K devices, then a maximum of 16 pages could need to be allocated for each possible host port connection. However, if an assumption is made that on average a given host port—control unit port connection will not access more than 8K devices, then far fewer pages will need to be allocated for the device data structure than would be needed if host and port connections would likely access all possible logical volume 14a, 14b . . . 14n. Equivalently, number of device data structures can be arbitrarily limited to M×N such that, for M supported volume groups, the average number pages available per volume group is N<16.

Described embodiments provide a technique to maintain device (logical volume 14a, 14b . . . 14n) accessibility information for host port and control unit port connections in an optimal manner that conserves memory space by creating the data structures and provisioning memory for the volume group accessibility information as needed when establishing a host and port connection to a device. Further, because the volume group information is maintained for only established connections between host ports, control unit ports, and logical volumes, memory space is conserved because the maximum possible needed volume group information is not automatically reserved.

Figure 6:
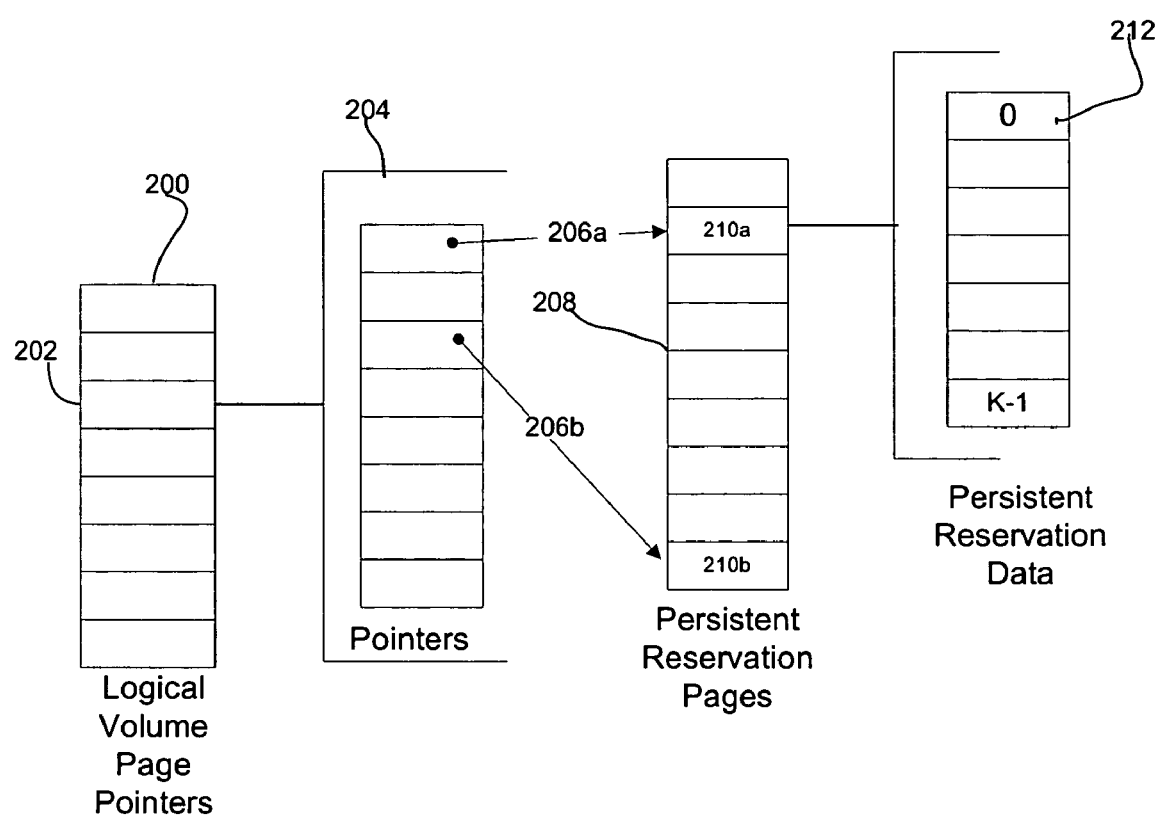
FIG. 6 illustrates an embodiment of data structures used to maintain persistent reservation information.

FIG. 6 illustrates an arrangement of data structures used to maintain persistent reservation information 26 for logical volumes 14a, 14b . . . 14n. Logical volume 14a, 14b . . . 14n pointer pages 200 have one page, e.g., 202, for each logical volume 14a, 14b . . . 14n, where each page, e.g., 202, has a plurality of pointers 204. Each pointer 206a, 206b of the pointers 204 addresses one page 210a, 210b of the persistent reservation pages 208. Each persistent reservation page, e.g., 210a, has K entries (0 to K-1) of persistent reservation data storing for the associated logical volume 14a, 14b . . . 14n. As discussed, persistent reservation information is maintained for each logical volume 14a, 14b . . . 14n identifying certain information for different hosts 2a, 2b . . . 2n accessing that logical volume 14a, 14b . . . 14n that must be made persistent for a particular logical volume 14a, 14b . . . 14n and host 2a, 2b . . . 2n connection.

Figure 7:
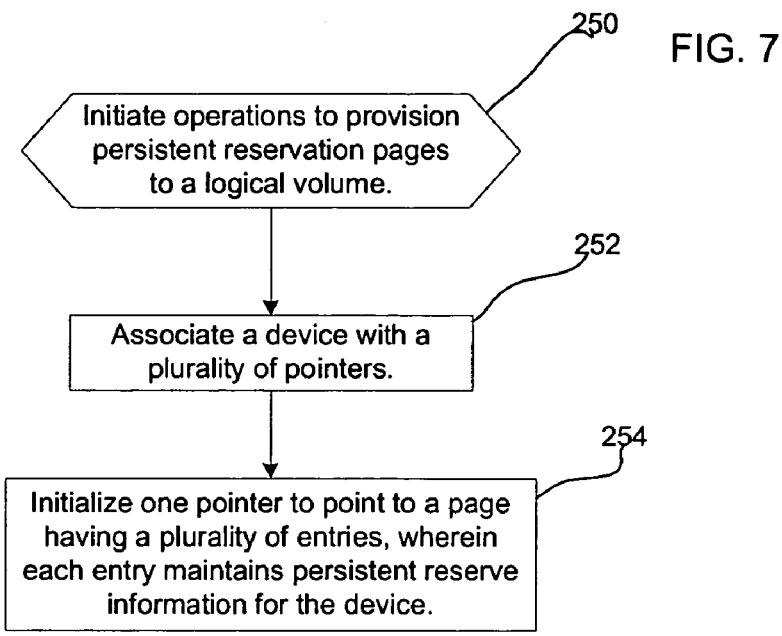
FIGS. 7, 8, 9, and 10 illustrate an embodiment of operations to generate and use the persistent reservation information.

FIG. 7 illustrates an embodiment of operations performed by the I/O manager 12 to provision pages for persistent reservation data. Upon initiating (at block 250) operations to provision persistent reservation pages to a device (logical volume 14a, 14b . . . 14n), a page, e.g., 202, of a plurality of pointers, e.g., 204 is associated (at block 252) with the device (logical volume 14a, 14b . . . 14n). The I/O manager 12 initializes (at block 254) one pointer, e.g., 206a, 206b, to point to a persistent reservation page, e.g., 210a, 210b, having a plurality of entries, wherein each entry maintains persistent reserve data 212 for the device (logical volume 14a, 14b . . . 14n). In this way, initially, for each device (logical volume 14a, 14b . . . 14n) only one page is allocated for persistent reservation data 212. The persistent reserve information may consist of the World Wide Port Number (WWPN) of a host port that registered with the control unit through a persistent reservation out command; a registration key provided by the host port at the point of registration; and a reservation type which is established at the point the host issues a persistent reservation out command to create a reservation. The reservation type determines how reservation requests from multiple host are handled. Persistent reservation information may be preserved through a power cycle.

Figure 8:
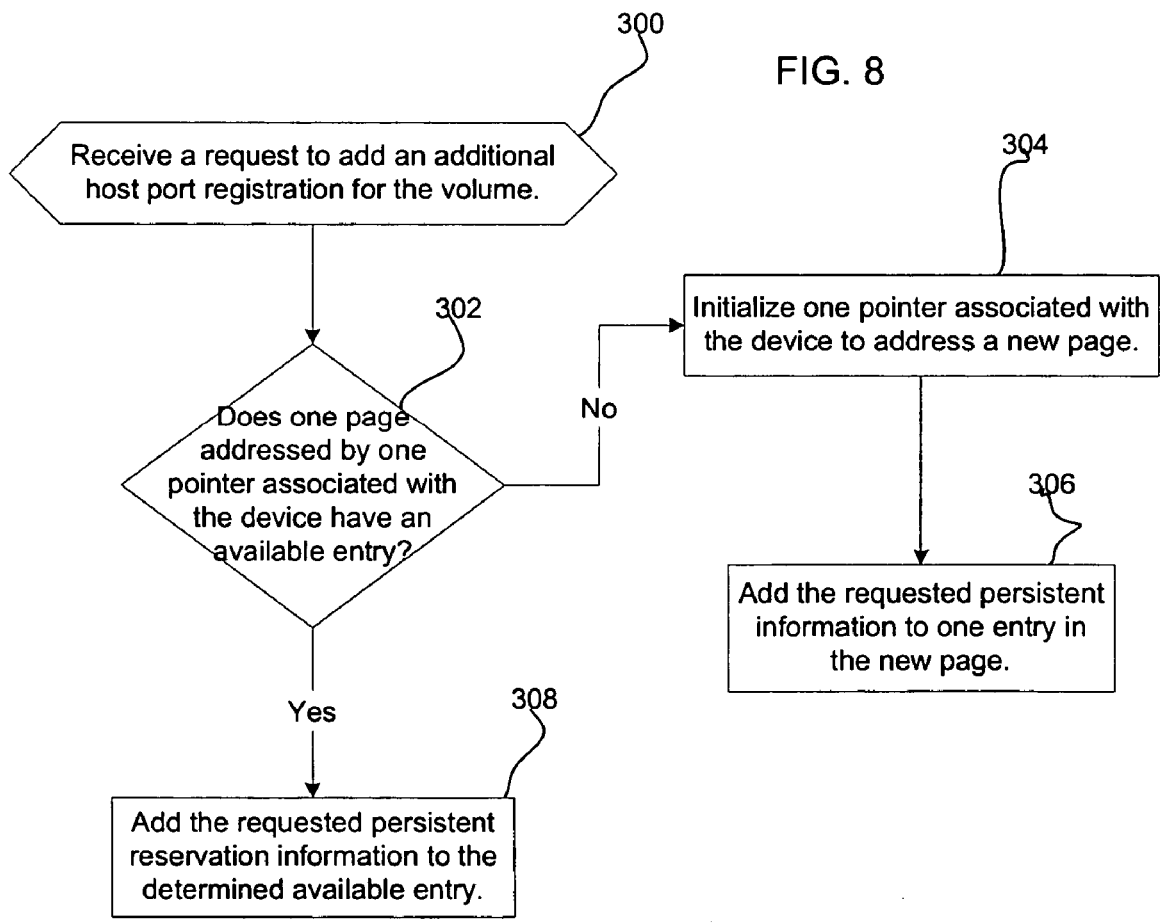

FIG. 8 illustrates an embodiment of operations performed by the I/O manager 12 to provision additional pages, e.g., 60, for persistent reservation data for a logical volume 14a, 14b . . . 14n. Upon receiving (at block 300) a request to add an additional host port registration for the volume, a determination is made (at block 302) as to whether one persistent reservation page, e.g., 210a, 210b, addressed by one pointer, e.g., 206a, 206b, associated with the device (logical volume 14a, 14b . . . 14n) has an available entry (0 to K-1). If not, one pointer, e.g., 206a, 206b, associated with the device is initialized (at block 304) to address a new persistent reservation page, e.g., 60. The requested persistent information is added (at block 306) to the first entry 212 in the new page, e.g., 210a. If (at block 302) one of the existing pages, e.g., 210a, 210b, addressed by one pointer, e.g., 206a, 206b, does have an available entry, then the requested persistent reservation information is added (at block 308) to the determined available entry. In this way, additional pages to store persistent reservation data are initialized only when all other allocated pages have no available entries, so as to conserve the allocation of pages in memory to store persistent reservation data.

Figure 9:
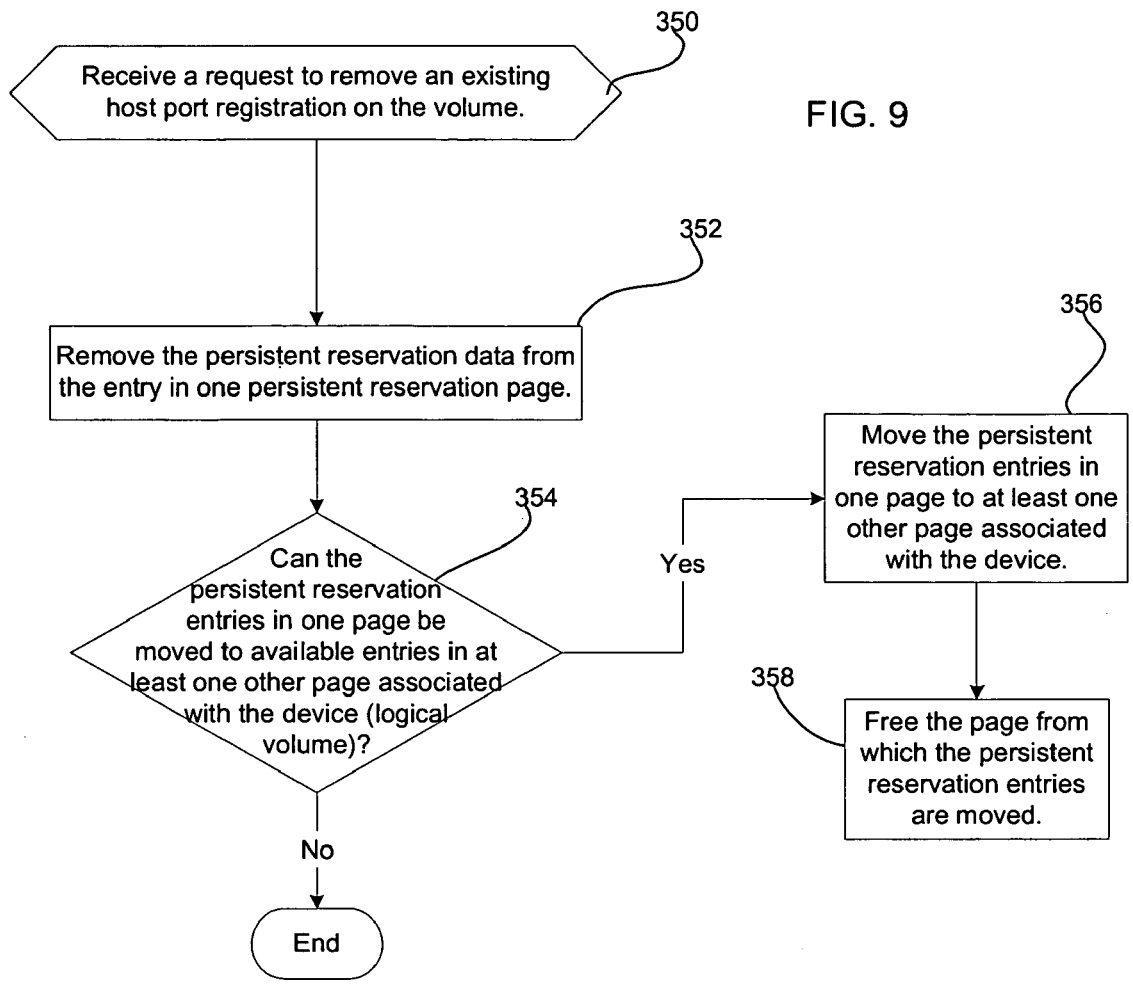

FIG. 9 illustrates an embodiment of operations performed by the I/O manager 12 to remove persistent reservation data.

Upon initiating (at block 350) an operation to remove an existing host port registration on the volume, the persistent reservation is removed (at block 352), i.e., persistent reservation information from one entry, e.g., 212, in one persistent reservation page, e.g., 210a, 210b, addressed by one pointer, e.g., 206a, 206b, associated with the device (logical volume 14a, 14b . . . 14n), The I/O manager 12 may then perform an operation to defragment the persistent reservation data and consolidate as many entries of persistent reservation on as few persistent reservation pages 208 as possible for one logical volume 14a, 14b . . . 14n. If (at block 354) the persistent reservation entries, e.g., 212, in one persistent reservation page, e.g., 210a, 210b, can be moved to available entries in at least one other page associated with the device (logical volume 14a, 14b . . . 14n), then the persistent reservation entries in that one page are moved (at block 356) to at least one other page associated with the device to consolidate persistent reservation data in as few pages as possible. The page from which the persistent reservation entries are moved may then be freed (at block 358). Otherwise, if the persistent reservation entries in one page cannot be consolidated onto fewer pages, then control ends.

Figure 10:
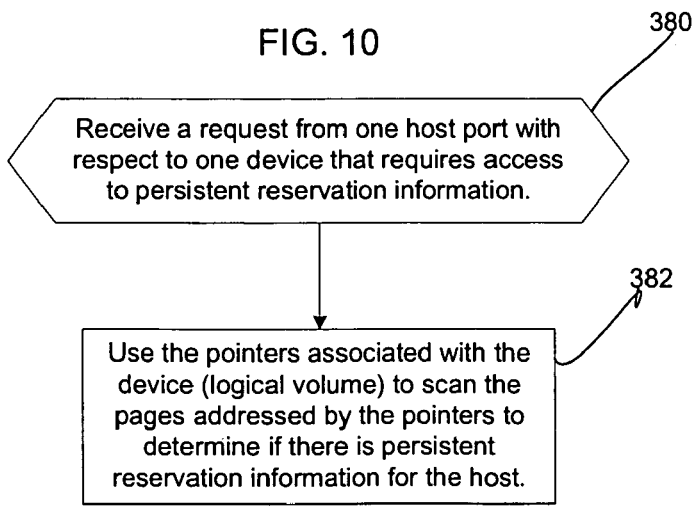

FIG. 10 illustrates an embodiment of operations performed by the I/O manager 12 to access persistent reservation data related to a host access request to one device (logical volume 14a, 14b . . . 14n). Upon receiving (at block 380) a request from one host with respect to one device, the I/O manager 12 uses (at block 382) the active pointers 206a, 206b associated with the device (logical volume) to scan the pages addressed by the pointers to determine if there is persistent reservation information for the host initiating the request. This persistent reservation information may be used collectively to determine which host ports are registered for reservation on a given logical volume; what type of reservations exist for each host port; and from this information, how to handle processing of additional reservation requests based on the architectural rules for handling persistent reservations in the SCSI definition.

In one embodiment, the number of pointers 204 to associate with a logical volume and the number of persistent reservation entries per page are chosen to support the estimated amount of preservation data that could be needed for one logical volume 14a, 14b . . . 14n. Further, if a given logical volume 14a, 14b . . . 14n is expected to have a limited number of connections from different hosts and ports, then fewer persistent reservation pages need to be allocated to accommodate the persistent reservation information.

Described embodiments provide a technique to maintain persistent reservation information for a logical volume 14a, 14b . . . 14n in an optimal manner that conserves memory space by creating the data structures and entries for the persistent reservation information as needed when adding persistent reservation for the logical volume 14a, 14b . . . 14n.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The reference letter "n" is used to refer to an instance number of an element, e.g., hosts 2a, 2b . . . 2n, volumes 14a, 14b . . . 14n, and may indicate a different or same number of elements in different usages. For instance the number of hosts 2n may differ from the number of volumes 14n.

FIGS. 2 and 5 show arrangements of data structures used to maintain volume group and persistent reservation information. In alternative embodiments, additional structures may be used to expand the number of possible volumes and persistent reservation information entries that may be needed.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIGS. 3, 4, and 6-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving a request to create a host port to control unit port connection;

defining in a volume group data structure a volume group entry having a plurality of pointers for the host port and control unit port pair;

adding at least one device address to the volume group that is accessible to the host port and control unit port connection by initializing at least one pointer in the volume group entry to address at least one device data structure; and indicating, for each of the at least one device address, in the at least one device data structure addressed by the at least one pointer in the volume group entry that the device address is accessible to the host port and control unit port connection.

2. The method of claim 1, wherein associating the host port and the control unit port pair with the volume group comprises:

adding a control block associated with the host port and control unit port pair including a volume group pointer; and initializing the volume group pointer to address the volume group entry in the volume group data structure associated with the host port and the control unit port pair.

3. The method of claim 1, wherein each pointer in the volume group entry is capable of addressing a different device data structure, wherein each device data structure indicates the accessibility of different devices.

4. The method of claim 1, further comprising:

receiving a request from a host port and control unit port pair to access one target device;

determining the volume group entry in the volume group data structure associated with the host port and control unit port pair;

using one pointer in the determined volume group entry to access one device data structure;

determining whether the accessed device data structure indicates that the device is accessible; and enabling the request on the host port and control unit port pair to access the target device in response to determining that the device data structure indicates that the target device is accessible.

5. The method of claim 4, wherein the target device is identified by a device address, wherein a first portion of the device address indicates one pointer in the volume group data structure, wherein a second portion of the device address indicates one entry in the device data structure addressed by the pointer, further comprising:

using the first portion of the device address to determine the pointer in the volume group entry that is used to access one device data structure; and using the second portion of the device address to determine the entry in the device data structure corresponding to the target device.

6. The method of claim 1, wherein a first portion of a device address indicates one pointer in the volume group and wherein a second portion of the device address indicates one entry in the device data structure addressed by the pointer.

7. The method of claim 6, wherein the operation is initiated to enable the request on the host port and control unit port pair to access one device having a device address, wherein initializing the at least one pointer comprises initializing one pointer identified by the first portion of the device address, and wherein indicating in the device data structure the accessibility of the device comprises indicating the accessibility in one entry in the device data structure identified by the second portion of the device address.

8. The method of claim 6, wherein the device address corresponds to an external device address used by the host on the host and port connection to reference the device.

9. The method of claim 1, wherein the device data structure indicates the accessibility of devices having consecutive device addresses.

10. The method of claim 9, wherein at least two pointers in the volume group entry address different device data structures, and wherein at least two of the device data structures addressed by the pointers indicate the availability of devices having discontiguous device addresses.

11. The method of claim 9, wherein at least one device data structure indicates that less than all the devices identified in the device data structure are accessible.

12. The method of claim 1, wherein the device comprises a logical storage unit managed by the control unit and wherein the device data structure comprises a bitmap, and wherein each bitmap value in the bitmap corresponds to one device.

13. A system in communication with hosts having host ports and devices, comprising:

a plurality of storage controller ports;

a processor;

a memory including a volume group data structure and at least one device data structure; and a computer readable medium including code executed by the processor to perform operations, the operations comprising:

i) receiving a request to create a host port to control unit port connection;

ii) defining in the volume group data structure a volume group entry having a plurality of pointers for the host port and control unit port pair;

iii) adding at least one device address to the volume group that is accessible to the host port and control unit port connection by initializing at least one pointer in the volume group entry to address at least one device data structure; and iv) indicating, for each of the at least one device address, in the at least one device data structure addressed by the at least one pointer in the volume group entry that the device address is accessible to the host port and control unit port connection.

14. The system of claim 13, wherein associating the host port and the control unit port pair with the volume group comprises:

adding a control block associated with the host port and control unit port pair including a volume group pointer; and initializing the volume group pointer to address the volume group entry in the volume group data structure associated with the host port and the control unit port pair.

15. The system of claim 13, wherein each pointer in the volume group entry is capable of addressing a different device data structure, wherein each device data structure indicates the accessibility of different devices.

16. The system of claim 13, wherein the operations further comprise:

receiving a request from a host port and control unit port pair to access one target device;

determining the volume group entry in the volume group data structure associated with the host port and control unit port pair;

using one pointer in the determined volume group entry to access one device data structure;

determining whether the accessed device data structure indicates that the device is accessible; and enabling the request on the host port and control unit port pair to access the target device in response to determining that the device data structure indicates that the target device is accessible.

17. The system of claim 13, wherein a first portion of a device address indicates one pointer in the volume group and wherein a second portion of the device address indicates one entry in the device data structure addressed by the pointer.

18. An article of manufacture including code in communication with hosts having host ports, devices, and a memory including data structures, wherein the code is capable of causing operations to be performed, the operations comprising:

receiving a request to create a host port to control unit port connection;

defining in a volume group data structure a volume group entry having a plurality of pointers for the host port and control unit port pair;

adding at least one device address to the volume group that is accessible to the host port and control unit port connection by initializing at least one pointer in the volume group entry to address at least one device data structure; and indicating, for each of the at least one device address, in the at least one device data structure addressed by the at least one pointer in the volume group entry that the device address is accessible to the host port and control unit port connection.

19. The article of manufacture of claim 18, wherein associating the host port and the control unit port pair with the volume group comprises:

adding a control block associated with the host port and control unit port pair including a volume group pointer; and initializing the volume group pointer to address the volume group entry in the volume group data structure associated with the host port and the control unit port pair.

20. The article of manufacture of claim 18, wherein each pointer in the volume group entry is capable of addressing a different device data structure, wherein each device data structure indicates the accessibility of different devices.

21. The article of manufacture of claim 18, wherein the operations further comprise:

receiving a request from a host port and control unit port pair to access one target device;

determining the volume group entry in the volume group data structure associated with the host port and control unit port pair;

using one pointer in the determined volume group entry to access one device data structure;

determining whether the accessed device data structure indicates that the device is accessible; and enabling the request on the host port and control unit port pair to access the target device in response to determining that the device data structure indicates that the target device is accessible.

22. The article of manufacture of claim 21, wherein the target device is identified by a device address, wherein a first portion of the device address indicates one pointer in the volume group data structure, wherein a second portion of the device address indicates one entry in the device data structure addressed by the pointer, wherein the operations further comprise:

using the first portion of the device address to determine the pointer in the volume group entry that is used to access one device data structure; and using the second portion of the device address to determine the entry in the device data structure corresponding to the target device.

23. The article of manufacture of claim 18, wherein a first portion of a device address indicates one pointer in the volume group and wherein a second portion of the device address indicates one entry in the device data structure addressed by the pointer.

24. The article of manufacture of claim 23, wherein the operation is initiated to enable the request on the host port and control unit port pair to access one device having a device address, wherein initializing the at least one pointer comprises initializing one pointer identified by the first portion of the device address, and wherein indicating in the device data structure the accessibility of the device comprises indicating the accessibility in one entry in the device data structure identified by the second portion of the device address.

25. The article of manufacture of claim 23, wherein the device address corresponds to an external device address used by the host on the host and port connection to reference the device.

26. The article of manufacture of claim 18, wherein the device data structure indicates the accessibility of devices having consecutive device addresses.

27. The article of manufacture of claim 26, wherein at least two pointers in the volume group entry address different device data structures, and wherein at least two of the device data structures addressed by the pointers indicate the availability of devices having discontiguous device addresses.

28. The article of manufacture of claim 26, wherein at least one device data structure indicates that less than all the devices identified in the device data structure are accessible.

29. The article of manufacture of claim 18, wherein the device comprises a logical storage unit managed by the control unit and wherein the device data structure comprises a bitmap, and wherein each bitmap value in the bitmap corresponds to one device.

* * * * *